(12) United States Patent
Shacklett, III et al.

(10) Patent No.: US 6,265,103 B1
(45) Date of Patent: Jul. 24, 2001

(54) ENCLOSURE ASSEMBLY FOR DRY CELLS

(75) Inventors: James H. Shacklett, III, Gwynned Valley; Philip M. Henry, Morrisville, both of PA (US)

(73) Assignee: Steinbeis IBL GmbH, Meerene (DE)

( * ) Notice: Subject to any disclaimer, the term of this patent is extended or adjusted under 35 U.S.C. 154(b) by 0 days.

(21) Appl. No.: 08/721,111

(22) Filed: Sep. 26, 1996

(51) Int. Cl.⁷ .................................... H01M 2/02
(52) U.S. Cl. ...................... 429/177; 429/167; 429/176
(58) Field of Search .................. 429/163, 167, 429/177, 176, 174

(56) References Cited

U.S. PATENT DOCUMENTS

| | | |
|---|---|---|
| 3,223,557 | 12/1965 | Reilly et al. |
| 3,753,781 | 8/1973 | Parker et al. |
| 4,172,163 * | 10/1979 | Magnotta ................ 428/40 |
| 4,287,274 * | 9/1981 | Ibbotson et al. ........... 429/156 |
| 4,349,592 * | 9/1982 | Nussbaum ................ 428/31 |
| 4,608,323 * | 8/1986 | Zaborney ................ 429/167 |
| 4,627,154 * | 12/1986 | Pattison ................ 29/623.1 |
| 4,801,514 | 1/1989 | Will et al. |
| 4,911,994 | 3/1990 | Will et al. |
| 5,026,616 | 6/1991 | Schumm, Jr. |
| 5,079,108 | 1/1992 | Annen et al. |
| 5,262,251 | 11/1993 | Will et al. |
| 5,312,712 | 5/1994 | Will et al. |
| 5,326,654 | 7/1994 | Will et al. |
| 5,358,804 | 10/1994 | Will et al. |
| 5,445,856 * | 8/1995 | Chaloner-Gill ........... 428/35.9 |
| 5,591,540 * | 1/1997 | Louie et al. ............. 429/163 |

FOREIGN PATENT DOCUMENTS 1296891   3/1992   (CA).

* cited by examiner

Primary Examiner—John S. Maples
(74) Attorney, Agent, or Firm—Baker & McKenzie; Adam C. Underwood; Ronald D. Trice

(57) ABSTRACT

An enclosure assembly for a dry cell and a dry cell battery including such enclosure assembly wherein the enclosure assembly includes first and second layers of plastic material. The first layer of plastic material closely surrounds the dry cell and has physical characteristics sufficient to resist deterioration when contacted by exudate from the dry cell. Preferably, the first layer possesses chemical and physical barrier properties sufficient to retain cell exudate produced during discharge of the dry cell. The second layer closely surrounds the first layer and is fabricated from shrinkable plastic which encapsulates the first layer and produces a tight and chemically leak resistant seal around the dry cell.

7 Claims, 2 Drawing Sheets

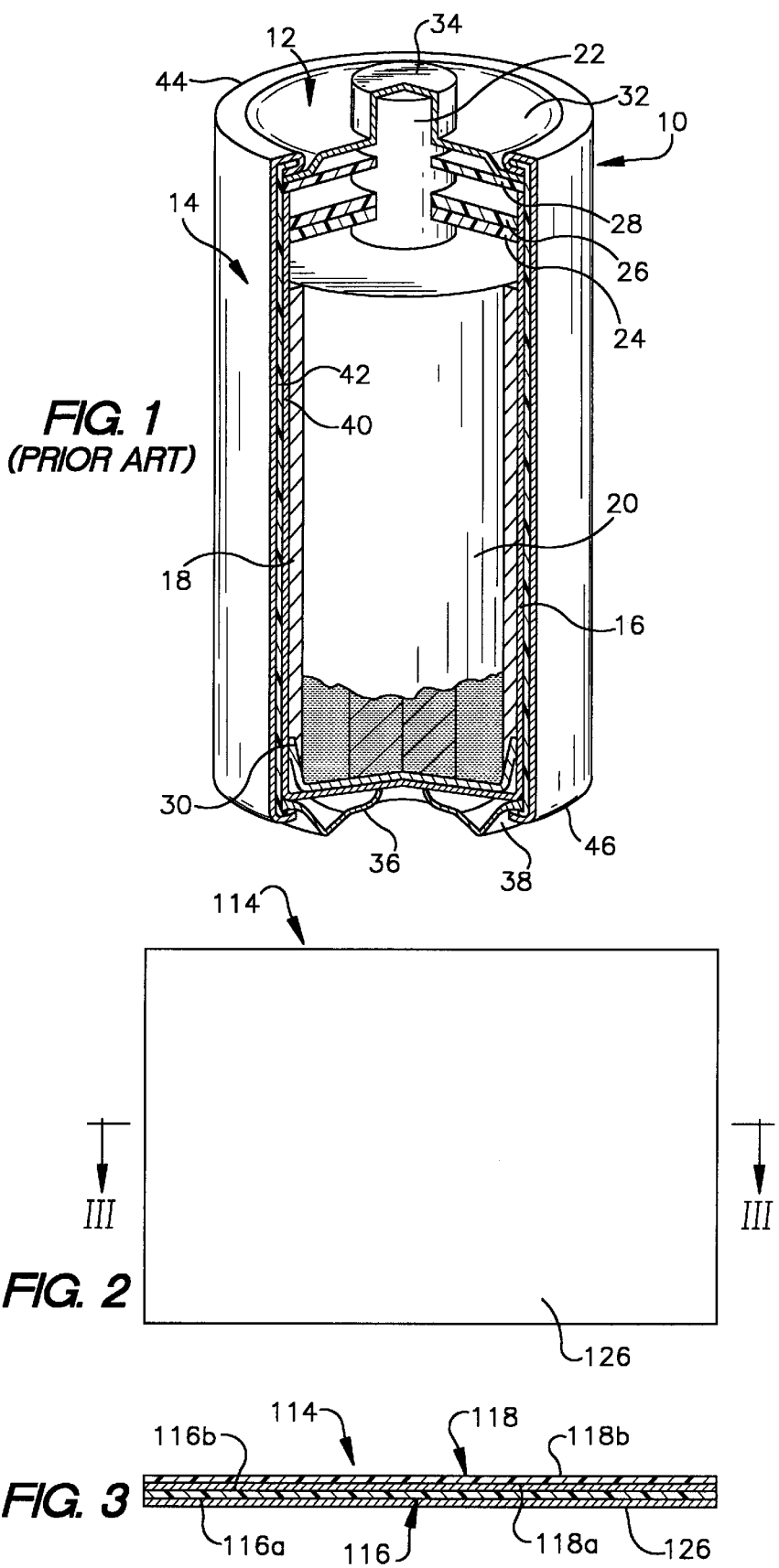

ENCLOSURE ASSEMBLY FOR DRY CELLS

FIELD OF THE INVENTION

The present invention relates in general to the manufacture of dry cells and, more particularly, to an inexpensive, compact, rugged, insulating and leak resistant enclosure assembly for dry cells.

BACKGROUND OF THE INVENTION

Leclanche type galvanic dry cell batteries have long been used as the energy source of choice in portable electronic equipment including flashlights, toys, radios, audiocassette and compact disc players, and other devices. An inherent disadvantage of such batteries, however, is their tendency to leak the cell exudate, which is a by-product of the electrochemical reaction by which the dry cells generate electrical energy. As is known, such leakage may result in premature discharge of the cell's stored energy. In addition, because of its highly corrosive nature, dry cell exudate leakage may result in irreversible damage to metallic exterior components of the battery itself or, more importantly, the equipment with which the battery may be used.

Carbon zinc Leclanche dry cells have largely been abandoned by consumers in favor of more expensive, powerful and reliable alkaline batteries. Battery manufacturers have also disfavored carbon zinc designs because of the numerous bulky layers which comprise the cover which encases the dry cell as well as the problems associated with the leakage of corrosive exudate from such batteries. However, because carbon zinc dry cells are less expensive to manufacture than their alkaline counterparts and because many applications do not require the longer service life of alkaline cells, carbon zinc batteries are again becoming attractive alternatives in the marketplace.

More recent designs of carbon zinc batteries comprise a zinc outer casing rather than traditional cardboard casings which were particularly susceptible to leakage. Although zinc casings have reduced the amount of leakage from the cell, such casings have not eliminated leakage and have introduced certain structural problems. While the battery is in use, the carbon contained in the cell reacts with the zinc of the outer casing such that the zinc is consumed in the electrochemical process to produce electrical energy and zinc chloride is produced as a by-product. Over time, the electrochemical process consumes the zinc of the outer casing to the point where the thickness of outer wall is reduced. As the outer casing becomes thinner, the cell becomes more susceptible to zinc chloride and other exudate leakage as well as structural weakening of the cell itself.

Moreover, the exudate tends to react with and destroy pressure sensitive adhesive labels of standard construction which, in some dry cells, are applied to the external surface of the outer casing of the battery.

It has long been accepted in the alkaline battery and pressure sensitive labeling arts that a layer of shrink PVC must be used as the base layer of two-ply pressure sensitive adhesive labels. In this regard, a typical alkaline battery label construction comprises a base layer of polyvinyl chloride ("PVC") which shrinks approximately 45 to 55% in relation to its original size when heat is applied to the PVC, and a second outer layer of blown fiber PVC film. The facing surfaces of the two layers are bonded together via lamination techniques known in the art. Adhesive is applied to the exposed surface of the base layer in order to allow the labels to be adhered to the outer surface of the cell.

Although this sort of label construction is compatible with alkaline batteries, it cannot be used with carbon zinc batteries primarily because the base layer of shrinkable PVC cannot contain the cell exudate. Consequently, the two-ply PVC label of the type described above has been largely ignored as an alternative for carbon zinc batteries.

Accordingly, there exists a need for an inexpensive method and apparatus for (1) resisting exudate leakage from a carbon zinc battery cell, (2) protecting and supporting the cell structure as the outer zinc casing deteriorates over the cell's useful life and (3) providing aesthetically pleasing and durable indicia bearing surfaces for application of manufacturer's logos, instructions, and other information, many of which have relied on rigid outer casings of paper, metal and plastic.

Many proposals have been offered to counter the problem of dry cell battery exudate leakage. In U.S. Pat. No. 3,223,557 for example, the dry cell is disclosed as being encased within an oversized, loose-fitting, paper and plastic jacket defining a chamber between the body of the dry cell and the jacket. The purpose of the chamber is to collect and retain cell leakage. Even if absolutely effective in preventing leakage of liquid exudate, the bulkiness and loose fit of the jacket is undesirable.

First, the jacket adds undesirable size to the battery construction. To assure compatibility with most electrical equipment, dry cell batteries must assume standardized sizes, e.g., from AAA to D. Hence, in a dry cell battery constructed according to that described in U.S. Pat. No. 3,223,557 the outer dimensions of the protective jacket must correspond to such standardized sizes. In doing so, however, the actual size of the enclosed dry cell itself is compromised since there must also be provision of the aforementioned leakage retention chamber between the jacket and the dry cell. Consequently, a net reduction in the size of the dry cell reduces the volume of chemical material available to the cell for producing electrical energy, thereby reducing the power output and service life of the battery.

In addition, the loose fit of the jacket about the body of the dry cell also permits distortion and crushing of the jacket which may result in breakage to the jacket's seal and/or damage to the dry cell.

Somewhat more conventional dry cell enclosures are disclosed in U.S. Pat. Nos. 3,753,781 and 5,079,108. According to these designs, the dry cell is tightly encased within an insulator tube formed of cardboard or other suitable material which is closely surrounded by a metal or polymer coated paper jacket. Batteries of this sort have demonstrated varied degrees of success in resisting exteriorly applied impact stresses and containing cell exudate. In those batteries whose insulator is formed from cardboard or other fibrous material, the exudate leakage can readily saturate the insulator tube. And, if the protective outer jacket is made of metal, the exudate can corrode the jacket to a point where the exudate escapes from the jacket. Alternatively, if the outer jacket is constructed from polymer coated paper, the paper of the jacket may also become saturated thereby exposing the polymer to chemical attack. Moreover, as with the dry cell disclosed in U.S. Pat. No. 3,223,557, each of these constructions require bulky jackets to fit over the zinc anode can. Addition of these jackets not only decreases the amount of space available for the cell itself, it also adds numerous steps and additional cost to the manufacturing process. Each sleeve must also be manufactured to exacting specifications prior to assembly to assure that each component part fits together precisely.

U.S. Pat. No. 5,079,108 seeks to limit potential exudate leakage by enclosing substantially all or a portion of the dry cell in a combination of seal member of low moisture permeability, compression member and sealing means. The sealing means may be a thin walled adhesive plastic tape or a heat shrinkable wrap or tube. In this invention, the sealing means must cover all of the edge and at least a part of the upper surface of the sealing member. Moreover, a prefabricated insulator tube and paper jacket must slip over the dry cell and sealing means necessarily requiring the insulation tube and paper jacket must be fabricated to exacting tolerances prior to assembly. Consequently, the combination of these components complicates construction and adds to the manufacturing cost of the battery.

U.S. Pat. No. 5,026,616 describes a dry cell battery construction wherein the dry cell is enveloped by a single layer, electrically nonconductive jacket, such as an electroless plated plastic covers, which has an increased resistance to corrosion. The corrosion resistant jacket is prefabricated to precise tolerances. Moreover, there is no disclosure that the jacket itself may function as an aesthetically pleasing and durable indicia bearing surface without need for application of an additional label or outer coating.

U.S. Pat. Nos. 4,801,514, 4,911,994, 5,262,251, 5,312,712, 5,326,654, 5,358,804 and Canadian Patent No. 1,296,891 disclose multiple layer labels adapted for adhesive attachment to the outer circumferential surface of the protective jacket of a conventional Leclanche type dry cell battery. The multiple layer label constructions create a long-lasting and attractive indicia bearing surface about the circumference of the battery. The battery labels are formed from a plurality of very thin layers of stretchable plastic film, adhesives and indicia material. However, none of the structures disclosed provide for an inexpensive adhesive enclosure which is capable of resisting exudate leakage.

SUMMARY OF THE INVENTION

The present invention comprises an uncomplicated, rugged, leak resistant multiple layer dry cell battery enclosure having at least one indicia bearing surface and suitable for use with carbon zinc and other dry cell batteries. The enclosure eliminates the need for insulating layers and protective jackets presently required by conventional carbon zinc dry cell constructions. Typically, the enclosure of this invention will be in the form of a label and preferably a pressure sensitive label.

According to a presently preferred embodiment, the enclosure comprises a first or base layer and a second or top layer. The first layer, which is nearest the dry cell and preferably closely conforms thereto, is desirably formed from a plastic material having a composition that is resistant to chemical attack from the cell exudate produced during discharge of the dry cell. The first layer also provides additional support to the outer surface of the dry cell. As the dry cell discharges energy, the outer zinc wall is weakened as it becomes thinner during the electrochemical reaction within the cell. A material well-suited to provide additional support to the cell wall as well as resist deterioration due to exudate leakage is an approximately 0.5 mil (0.0005 in.) to 2 mil (0.002 in.) thick, non-shrinkable or shrinkable polyolefin film (including, without limitation, polypropylene and polyethylene films), having sufficient barrier properties to retain the gas and resist the chemical attack of the cell exudate produced during the useful service life of the battery.

The second layer preferably comprises a thin film of shrinkable plastic material. A presently preferred material is a shrinkable polyvinyl chloride sheet having a thickness of between about 0.6 mil to about 1.4 mil. Although the axial dimensions of the second layer may be somewhat greater than the first layer whereby the ends of the second layer may shrink radially inwardly to seal the enclosure about the electrically conductive ends of the dry cell, it is preferable that the axial dimensions of the first and second layers are substantially the same whereby both layers may contribute to sealing of the cell. Either or both of the first and second layers are preferably coatable, and/or transparent wherein desired indicia (such as brand names, instructions and the like) or a metallized layer may be displayed thereon or visible therethrough.

The layers of the enclosure may be sequentially applied to the circumferential surface of the dry cell. Preferably, however, the enclosure is of laminated construction whereby the enclosure may be applied to the dry cell as a unit. The first and second layers may be joined to one another by any suitable means, including heat or solvent bonding. In accordance with a presently contemplated assembly, the first and second layers are bound by a layer of adhesive that is resistant to the harmful effects of zinc chloride and/or other chemicals that may be exuded by the dry cell. A similar layer of adhesive may optionally be provided between the outer circumferential surface of the cell and the inner surface of the first layer.

This construction deviates considerably from prior teaching in the battery labeling art. More particularly, the first layer, which traditionally comprises a heat shrinkable PVC that is highly susceptible to chemical attack associated with carbon zinc batteries, instead comprises a material, such as a suitable polyolefin, e.g., polypropylene, polyethylene and the like, which is resistant to such chemical attack. Moreover, unlike prior art constructions, the second layer comprises a heat shrinkable layer, such as shrinkable PVC, instead of the traditional shrink-resistant blown film PVC. In their presently available commercial forms, no polyolefin films, acting alone, possess shrinkability characteristics sufficient to render such films useful as a carbon zinc battery label. For example, none can shrink to the extent necessary to curl inwardly and positively seal the opposite ends of a carbon zinc cell with respect to the circumferential sidewall thereof. Consequently, a high-shrinkage material must be used as the second layer of the enclosure to import to the enclosure the shrinkage characteristics necessary to press the first layer into tight conformance with the battery housing and seal the cell from exudate and gas leakage. The present inventors have discovered that a high-shrinkage PVC film exhibits the shrinkability necessary to effectuate these objectives.

Once the enclosure of the instant invention is applied to the cell, the enclosure and cell are exposed to heat or infrared radiation. In so doing, the second layer shrinks so as to encapsulate the first layer and produce a tight and chemically leak resistant seal around the cell. Should corrosive chemicals be exuded from the cell, the enclosure will retard or prevent the exudate from escaping from the edges or seams of the enclosure. And, because of the chemical and physical barrier properties of the first layer, the first layer will retard or prevent chemical exudate from leaching through to the second layer and thus to the circumferential surface of the enclosure itself.

Additionally, because the first and second layers of the enclosure are bonded together, the first layer will shrink with and maintain approximately the same size as the second layer as a result of the mechanical forces imposed on the first layer by the heat generated shrinkage of the second layer. In this regard, although not necessary, it is preferable that the first layer comprise a substantially shrinkable polyolefin film to further promote substantially uniform or even shrinkage of the first and second layers as a composite structure about the cell. Even shrinkage is desirable (and not a feature found in prior art alternatives) inasmuch as it avoids the problem of uneven shrinkage between layers of the enclosure. Such uneven shrinkage oftentimes tends to create wrinkles in multiple layered enclosures employing layers with differing shrink characteristics. The even shrinkage feature of this invention also allows for prefabrication of the enclosures with each layer of the enclosure having approximately the same size. Accordingly, enclosures may be produced in large quantities by adhering or laminating large sheets or webs of the first and second layer material to each other and employing standard die cutting methods to form individual enclosures of desired size. Prior to cutting individual enclosures from the laminated web, adhesive may be applied to the inner surface of the first layer and a layer of standard release paper may be applied thereto for removal before the enclosure is applied to the cell. Each enclosure is then in a form to be applied directly to the cell.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein:

FIG. 1 is an elevational view, in partial section, of a conventional Leclanche type dry cell battery;

FIG. 2 is a plan view of the interior of a dry cell enclosure constructed in accordance with the present invention in unrolled condition;

FIG. 3 is a cross-section view of the dry cell enclosure taken along line III—III of FIG. 2;

DETAILED DESCRIPTION OF THE INVENTION

Figure 4:
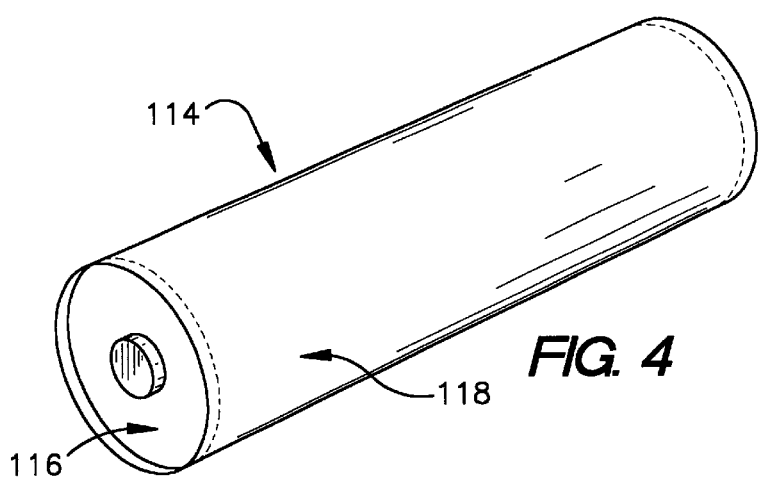
FIG. 4 is a view of the dry cell enclosure of the present invention formed into a composite tube.

Referring to the drawings, FIG. 1 illustrates a conventional carbon-zinc Leclanche type dry cell battery identified generally by reference numeral 10. Battery 10 is comprised of a dry cell 12 and cover 14.

As is known, dry cell 12 typically includes a substantially cylindrical, cup- or can- shaped anode 16 typically formed from zinc, a porous separator 18, graphite powder or carbon black and manganese dioxide moistened with ammonium chloride and zinc chloride 20, and a carbon rod current collector or cathode 22.

Other elements identified in FIG. 1 and conventional in Leclanche cell constructions include a support washer 24, a seal 26, a washer 28 and a cup-shaped insulator 30 located at the bottom of the zinc can 16. The cell 12 further comprises a first end member 32. The first end member 32 is typically fabricated from metal or metal coated plastic and is provided with a raised portion 34 configured to make electrical contact with the upper end of cathode 22 wherein first end member 32 functions as a first battery terminal. Likewise, cell 12 includes a second end member 36 of similar composition to the first end member 32. The second end member 36 is in electrical contact with the bottom of anode 16 and functions as a second battery terminal. For added strength, the second end member is preferably formed with a reinforcing corrugation 38. Cup-shaped anode 16 and the first and second end members 32 and 36, respectively, generally define the body of dry cell 12.

Cover 14 typically comprises an insulating member 40 closely surrounding cup-shaped anode 16 and a protective jacket 42 closely surrounding the insulating member 40. Insulating member 40 may be comprised of any suitable nonconductive material such as paper, cardboard or plastic. Jacket 42 is normally made of metal sheet which is crimped at its opposite end edges with sufficient force to retain the elements of the dry cell 10 in tightly assembled condition. Insulating member 40 prevents electrical communication between the jacket 42 and the first and second end members 32 and 36, respectively. The size of the cover 14 depends on the size of the standard dry cell 12 for which it is designed, e.g. AAAA through D sized cells.

FIGS. 2 and 3 reveal a presently preferred embodiment of a dry cell battery enclosure 114 constructed in accordance with the instant invention. Enclosure 114 may be used to protect and seal any conventional dry cell such as, for example, cell 12 shown in FIG. 1.

Enclosure 114, which is shown in unrolled condition for clarity of illustration, comprises a first or base layer 116 and a second or top layer 118, each of which layers define an inner and an outer surface respectively.

Figure 5:
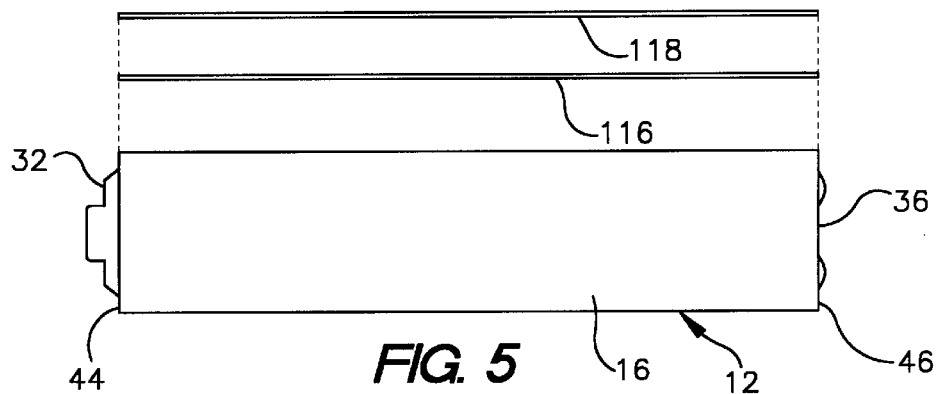
FIG. 5 is an exploded view of the dry cell enclosure of the present invention depicting the preferred axial dispositions of the first and second layers of the enclosure relative to the dry cell during assembly of a battery.

Upon assembly of a dry cell battery including a dry cell and enclosure 114, the inner surface 116a of the first base layer 116 is nearest and preferably affixed to the outer surface of a generally cylindrical, cup-shaped dry cell anode such as anode 16 of the dry cell 12 shown in FIGS. 1 and 5. The inner surface 118a of the second top layer 118 in turn is secured to the outer surface 116b of the first layer 116 by suitable means described hereinafter. The outer surface 118b of the second layer 118 defines the exterior of the enclosure 114 when the enclosure is disposed about a dry cell.

The first layer 116 is fabricated from a flexible plastic material having a composition that is resistant to chemical attack from the cell exudate produced during discharge of the cell. First layer 116 also preferably acts as an insulator between the outer surface of the dry cell and the outside surface of enclosure 114. Where first layer 116 is affixed to the outer surface of anode 16, the electrical conductivity of first layer 116 is preferably low so as to prevent dry cell 12 from shorting to ground, the equipment in which it is used or to a person handling the cell. First layer 116 is also preferably capable of providing support and containment of the dry cell components as the anode 16 of the dry cell is consumed during discharge of the battery.

Materials which manifest the many diverse physical and chemical barrier characteristics required of first layer 116 include flexible polyolefin films including, without limitation, polypropylene and polyethylene films. For example, polyolefin films suitable for use as first layer 116 include any of several clear or colored polypropylene film materials available from Mobil Chemical Co. of Chadds Ford, Pa., preferably having thicknesses of between approximately 0.5 mil (0.0005 in.) and 2.0 mil (0.002 in.).

It has been discovered that both substantially nonshrinkable polypropylene films (i.e., films having a shrinkage potential of less than about 10% relative to the original film size) and substantially shrinkable polypropylene films (i.e., films having a shrinkage potential of greater than about 10%) may be used with beneficial effect in the enclosure 114 of the present invention. Substantially non-shrinkable polypropylene has the advantages of ready availability and comparatively low cost in relation to substantially shrinkable polypropylene. By contrast, substantially shrinkable polypropylene, because of its greater shrinkage potential is believed to promote more uniform shrinkage of the enclosure 114 about a dry cell. However, no presently known polypropylene film has sufficient shrinkage potential to effectively function, by itself, as a shrinkable label capable of reliably preventing exudate and gas from leakage from a carbon zinc dry cell battery during discharge thereof. Accordingly, the first layer 116 must be supplemented by at least one additional second layer 118 having the requisite shrinkage and sealing properties lacking in the first layer.

To overcome the shrinkage and sealing difficulties of first layer 116, second layer 118 preferable comprises a thin film of substantially shrinkable plastic material. A presently preferred material is a shrinkable polyvinyl chloride ("PVC") sheet having a thickness of between about 0.6 mil to about 1.4 mil and preferably having the ability to shrink to approximately 45% and 55% of its original size. A preferred PVC is Model No. GE-15 available from Hoechst, Holland, N.V. of Weert, Holland. Other suitable shrinkable materials known in the art having generally similar (or greater or lesser) shrinkage potentials may also be used for second layer 118 so long as they effectively seal the dry cell from gas and exudent leakage.

The axial dimensions of the second layer may be somewhat greater than the first layer 116. So constructed, the ends of the second layer 118 may shrink radially inwardly about first and second edges 44 and 46 respectively of the outer surface of the cell. However, in a presently preferred embodiment, the axial dimensions of second layer 118 are approximately the same as first layer 116. Accordingly, the ends of both first layer 116 and second layer 118 shrink radially inwardly around first and second edges 44 and 46 respectively of the outer surface of the cell primarily due to the considerable shrinkage potential of the second layer 118. When enclosure 114 comprises shrinkable PVC as second layer 118 and nonshrinkable polypropylene as first layer 116, the radial shrinkage of the first and second layers 116 and 118 around edges 44 and 46 will typically not exceed about 900 from normal, which is generally sufficient to provide reliable sealing of a dry cell.

It is most desirable for the overall thickness of the enclosure 114 to be minimized so that the volume of the cell itself may be maximized. Maximization of cell volume permits additional volume for power producing components and this increases the service life of the battery.

Either or both of the first layer 116 and the second layer 118 are preferably coatable, metallizable and/or transparent wherein desired indicia, such as brand names, logos, information and instructions, may be displayed thereon or visible therethrough.

The first and second layers 116 and 118 respectively may be applied to a dry cell either manually or with automated equipment according to any of several processes. For instance, layers 116 and 118 of enclosure 114 may be sequentially applied to the outer circumferential surface of a dry cell. Preferably, however, the enclosure 114 is of laminated construction wherein it may be wrapped around a dry cell as a unitary composite sheet such as shown in FIGS. 2 and 3. Alternatively, enclosure 114 may take the form of a unitary composite tube such as shown in FIG. 4 which may be slipped over a dry cell or into which dry cell may be inserted. In yet another embodiment, tubular layers 116 and 118 respectively may be sequentially applied to the outer circumferential surface of a dry cell.

Although it is not necessary, it is preferable that the first and second layers 116 and 118 respectively be secured to one another by any suitable means, including heat or solvent bonding. In accordance with a presently preferred assembly, the first and second layers 116 and 118 are bound by a layer 124 of adhesive which is (1) compatible with zinc chloride or other chemicals which may be exuded by the dry cell, and (2) strong enough to maintain the bond between layers 116 and 118 throughout the service life of the dry cell. A preferred adhesive 124 is a two part epoxy such as Model No. Lamal HSA available from Morton International, Inc. of Chicago Ill.

It is essential to provide an adhesive layer 124 of sufficient strength, or otherwise securely bond the first and second layers, inasmuch as second layer 118 will generally shrink considerably more than first later 116 when exposed to heat or infrared radiation. Such differential shrinkage causes the second layer 118 to exert shear forces upon the first layer 116 which in turn cause the first layer to be shrunk and mechanically compressed about the circumferential wall of the dry cell.

Although not necessary, it is also preferable to provide a layer of adhesive, such as pressure sensitive or other adhesive between the outer circumferential surface of the dry cell and the inner surface 116a of the first layer 116. Adhesive 126 is also preferably compatible with zinc or other chemicals that may be exuded by the dry cell. According to a presently preferred embodiment, adhesive 126 is provided on the inner surface 116a of the first layer 116, as indicated by reference numeral 126 in FIG. 2. Alternatively, adhesive 126 may be provided on the outer surface of the dry cell. A preferred adhesive 126 is available through FLEXcon of Spencer, Mass.

Figure 6:
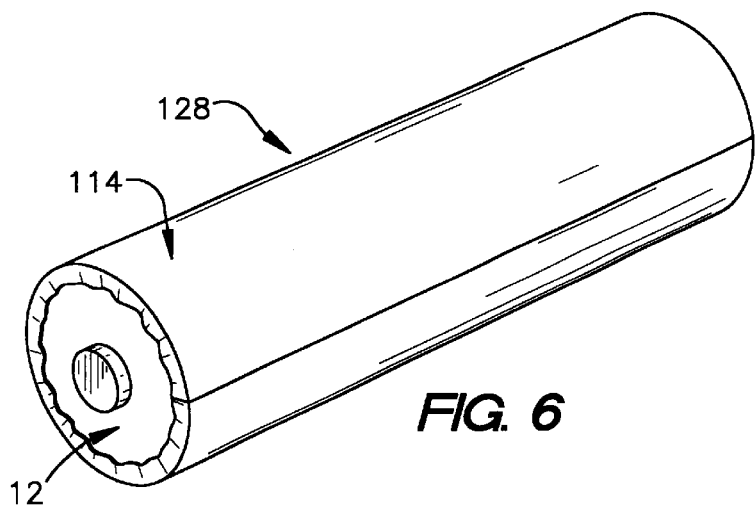
FIG. 6 is an elevational view, in partial section of a Leclanche type dry cell battery provided with a protective enclosure in accordance with the present invention.

Once the enclosure 114 is applied to a cell, such as cell 12 of FIGS. 1 and 5, the enclosure 114 is exposed to heat or infrared radiation of sufficient intensity to shrink the second layer 118 about cell 12. In so doing, there is produced a completely assembled dry cell battery 128 as depicted in FIG. 6.

Where layers 116 and 118 are not bonded together, the first layer 116 should be of sufficient size to envelope a dry cell yet somewhat smaller in size than the second layer 118, whereby the second layer 118 may shrink so as to encapsulate the first layer 116.

As discussed hereinabove, however, in the preferred embodiment layers 116 and 118 are bonded together and applied to the cell as a unitary composite enclosure 114. When the cell and enclosure 114 are exposed to heat or radiation of sufficient intensity to shrink second layer 118 about cell 12, first layer 116 shrinks in part due to its exposure to heat or radiation, although the bulk of shrinkage of the first layer is believed to be attributable to the mechanically imposed compressive forces caused by the shrinkage of second layer 118. Where first layer 116 is comprised of a suitable polyolefin film and second layer 118 is comprised of shrinkable PVC film, the overall shrinkage of enclosure 114 is typically about 40 to 55% of its original size. However, the percentage shrinkage is largely controlled by the thickness and precise compositions of each layer. This preferred embodiment also produces a chemically leak resistant enclosure around cell 12. Accordingly, should corrosive chemicals exude from cell 12, enclosure 114 of this embodiment will not deteriorate upon contact with the exudate and will retard the escape of the exudate from enclosure 114.

In addition, the chemical barrier properties of the first layer 116 prevent chemical exudate from leaching through to the second layer 118 and thus the circumferential surface of the enclosure 114. Moreover, the compositions of first layer 116 and adhesives 124 and 126 are so selected so that they are not susceptible to deterioration upon contact with the corrosive gases which may be released from cell 12. Thus, when enclosure 114 is properly constructed, it provides a chemically leak resistant cover or label for a carbon zinc dry cell battery.

Enclosure 114 also provides electrical insulation advantages. Because the first and second layers 116 and 118, respectively, of enclosure 114 are formed entirely from electrically nonconductive material, the need for a cardboard or similar means (such as insulating member 40 of battery 10 of FIG. 1) is eliminated.

Moreover, the thickness of enclosure 114 of this invention corresponds substantially to or is less than that of the insulating members 40 and protective jackets 42 (FIG. 1) currently used in the manufacture of carbon zinc dry cell batteries. As a result, carbon zinc dry cell batteries incorporating enclosures constructed in accordance with the present invention may be made to standard battery sizes with no compromise in the size, power output or service life of the enclosed dry cell. To the extent that the thickness of enclosure 114 is less than that of insulating member 40 and protective jacket 42, a dry cell 12 may actually be made somewhat larger than those currently manufactured without increasing the overall size of battery 10. Accordingly, improvements in power output and service life may be enhanced by utilizing enclosure 114 of this invention.

Additionally, enclosure 114 serves not only as a protective cover for a dry cell but also as an effective medium by which to display a manufacturer's logo or other desired indicia on the circumferential surface of the battery. Thus, the various coatable and/or metallizable surfaces of the first and second layers 116, 118 of enclosure 114 obviate the need to imprint, affix additional labels, or otherwise apply additional indicia to the exterior of the battery following application of enclosure 114. Consequently, dry cell batteries equipped with an enclosure constructed in accordance with the present invention may be produced at lower cost and in less time than similar batteries heretofore known in the art.

Enclosure 114 may be produced in large quantities and at substantially lower costs than conventional enclosures. Because enclosure 114 is substantially comprised of relatively inexpensive layers of plastic films and adhesives, the manufacture of large quantities of enclosures 114 lends itself to conventional label manufacturing processes such as, for example, rotogravure printing processes. Such processes would comprise laminating together webs of first or base layer 116 material (such as shrinkable or non-shrinkable polypropylene) and second or top layer 118 material (such as shrinkable PVC). Such lamination may also include an application of a layer of adhesive 124 to aid in bonding the layers together. Multiple individual enclosures 114 may then be cut from the composite web by rotary die or other cutting or separation means. A layer of adhesive 126 may also be applied to surface 116a of the laminated web and a suitable release paper may be applied to adhesive 126 prior to cutting individual enclosures 114 from the web. A construction method such as this allows for the finished enclosures 114 to be retained on the release paper for shipping, storage and ease in manual or automatic application to each dry cell.

Because enclosure 114 has all of the characteristics of conventional pressure sensitive labels, conventional labeling equipment may be employed for automatic application of enclosures 114 to each dry cell. Moreover, when rotogravure or other conventional printing means are used to construct enclosures 114, brand names, logo, artwork, information, instructions and other desired indicia may also be applied to the various surfaces of layers 116 and 118 during the assembling of enclosure 114. Moreover, although the enclosure 114 has been described in connection with its use with carbon zinc dry cell batteries because it specifically addresses and effectively resolves a long-standing problem associated therewith, it will be understood from the foregoing that the enclosure may be used with alkaline and other dry cell batteries which do not exhibit the exudate difficulties of carbon zinc bateries.

Although the invention has been described in detail for the purpose of illustration, it is to be understood that such detail is solely for that purpose and that variations can be made therein by those skilled in the art without departing from the spirit and scope of the invention except as it may be limited by the following claims.

What is claimed is:

1. A heat shrinkable enclosure assembly for a dry cell comprising:

a first layer comprising a release paper;

a second layer comprising a material substantially resistant to deterioration when contacted by exudate produced by a dry cell, the second layer defining an inner surface and an outer surface, the inner surface of the second layer releasably adhered to the release paper; and a substantially shrinkable third layer, the third layer defining an inner surface and an outer surface, the inner surface of the third layer disposed on the outer surface of the second layer;

wherein said second layer comprises a polyolefin material.

2. The enclosure assembly of claim 1 wherein said polyolefin material is polypropylene.

3. The enclosure assembly of claim 1 wherein said second layer has a thickness of between about 0.5 to about 2 mil.

4. The enclosure assembly of claim 1 wherein said third layer is fabricated from shrinkable polyvinyl chloride.

5. The enclosure assembly of claim 4 wherein said shrinkable polyvinyl chloride has a shrinkage potential of between about 45 to about 55 percent relative to an original size of said polyvinyl chloride.

6. The enclosure assembly of claim 4 wherein said third layer has a thickness of between about 0.6 to about 1.4 mil.

7. The enclosure assembly of claim 1 wherein said third layer has a thickness of between about 0.6 to about 1.4 mil.

* * * * *